(12) United States Patent
Lomnitz

(10) Patent No.: US 7,986,613 B2
(45) Date of Patent: Jul. 26, 2011

(54) DOWNLINK SUBCHANNELIZATION SCHEME FOR 802.16M

(75) Inventor: Yuval Lomnitz, Herzila (IL)

(73) Assignee: Intel Corporation, Santa Clara, CA (US)

( * ) Notice: Subject to any disclaimer, the term of this patent is extended or adjusted under 35 U.S.C. 154(b) by 144 days.

(21) Appl. No.: 12/344,498

(22) Filed: Dec. 27, 2008

(65) Prior Publication Data

US 2010/0166087 A1     Jul. 1, 2010

(51) Int. Cl.
*H04J 11/00* (2006.01)
(52) U.S. Cl. .................. 370/208; 375/259; 375/260
(58) Field of Classification Search .......... 370/203–211; 375/259–261
See application file for complete search history.

(56) References Cited

U.S. PATENT DOCUMENTS

| | | | |
|---|---|---|---|
| 7,574,179 B2 * | 8/2009 | Barak et al. | 455/101 |
| 2009/0047969 A1 * | 2/2009 | Lee et al. | 455/446 |
| 2009/0059859 A1 * | 3/2009 | Kuze et al. | 370/329 |
| 2009/0061778 A1 * | 3/2009 | Vrzic et al. | 455/62 |
| 2009/0092086 A1 * | 4/2009 | Lee et al. | 370/329 |
| 2009/0245197 A1 * | 10/2009 | Ma et al. | 370/330 |
| 2010/0322109 A1 * | 12/2010 | Ahn et al. | 370/254 |

* cited by examiner

*Primary Examiner* — Hassan Kizou
*Assistant Examiner* — Charles C Jiang
(74) *Attorney, Agent, or Firm* — Carrie A. Boone, P.C.

(57) ABSTRACT

Two novel subchannelization methods are disclosed, for use in a 802.16m system. A downlink subchannelization method supports both localized and distributed sub-carriers, different modulation modes, and supports a variety of different fractional frequency reuse (FFR) group allocations.

17 Claims, 5 Drawing Sheets

DOWNLINK SUBCHANNELIZATION SCHEME FOR 802.16M

TECHNICAL FIELD

This application relates to worldwide interoperability for microwave access (WiMAX) and, more particularly, to a subchannelization scheme to be used in the 802.16m standard.

BACKGROUND

WiMAX, or WiMAX-I, is based on the IEEE (Institute of Electrical and Electronics Engineers) 802.16e standard. WiMAX-I employs orthogonal frequency division multiple access (OFDMA) for transmissions, resulting in improved multi-path performance in non-line-of-sight environments. WiMAX-I may employ single-user (SU) or multiple-user (MU) multiple-input multiple output (MIMO) antenna techniques, adaptive modulation and coding schemes, and flexible subchannelization. A new generation of WiMAX termed 802.16m is currently under development.

Under fixed WiMAX, a limited form of subchannelization is supported in the uplink only. Mobile WiMAX permits subchannelization in both the uplink and the downlink. Currently, there exist multiple subchannelization schemes for dividing frequency/time resources between users. Partially used sub-channel (PUSC), fully used sub-channel (FUSC), and adaptive modulation and coding (AMC) are three subchannelization schemes that may be used for mobile WiMAX.

An OFDMA symbol is made up of sub-carriers, divided into data sub-carriers, pilot sub-carriers, and null sub-carriers (e.g., guard band). Subchannelization schemes divide the available sub-carriers into groups called sub-channels. The sub-channels may include contiguous sub-carriers (localized) or sub-carriers that are more random in their distribution (distributed).

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, a novel subchannelization method is disclosed, for use in an 802.16m system. The subchannelization method, used for downlink transmissions, supports both localized and distributed sub-channels, different modulation modes, and supports a variety of different fractional frequency reuse (FFR) group allocations.

Figure 1:
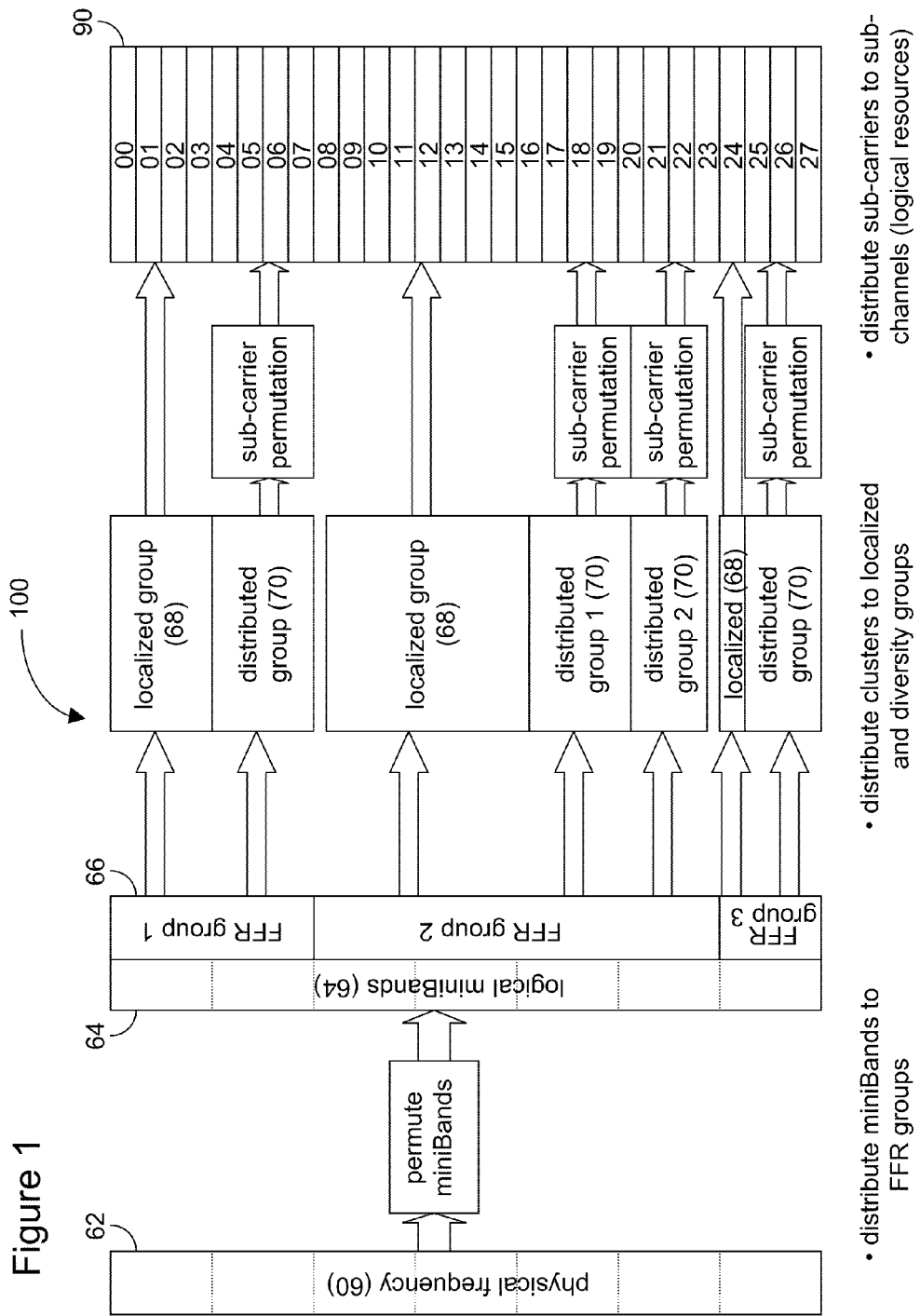
FIG. 1 is a block diagram of a downlink subchannelization method, according to some embodiments.

FIG. 1 is a schematic block diagram of a downlink subchannelization method 100, according to some embodiments. The downlink subchannelization method 100 divides a physical frequency allotment 60, or allocated bandwidth, into multiple sub-channels 90, as described below.

Figure 2:
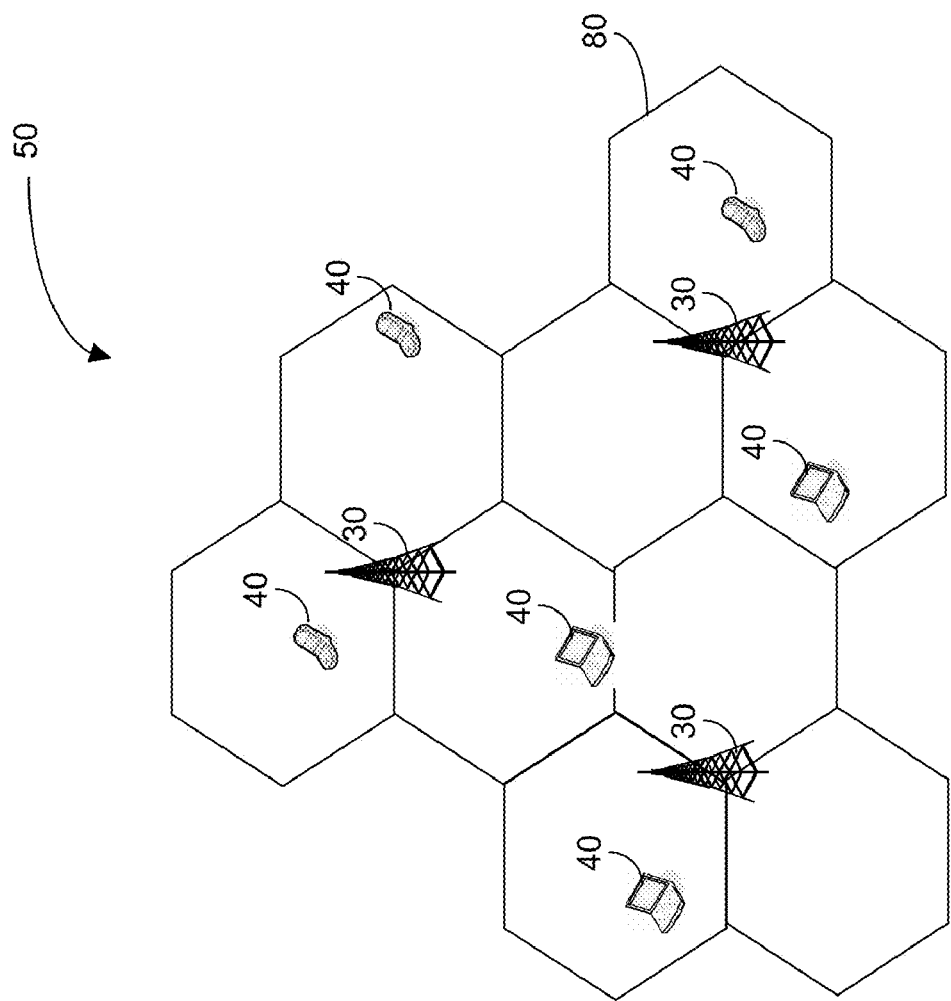
FIG. 2 is a block diagram of a cellular neighborhood that uses the subchannelization methods of FIG. 1, according to some embodiments.
Figure 3:
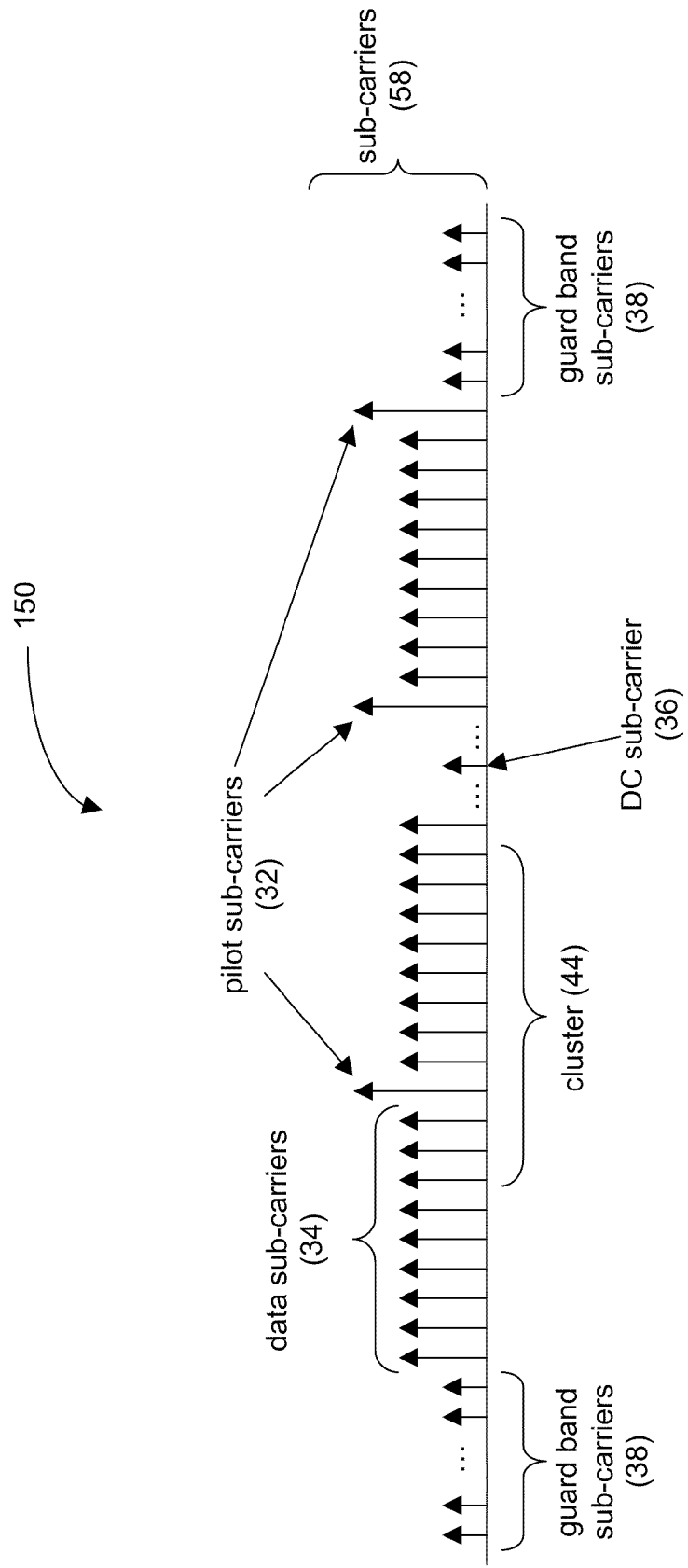
FIG. 3 is a schematic block diagram of an OFDMA sub-carrier structure including clusters used by the subchannelization method of FIG. 1, according to some embodiments.
Figure 4:
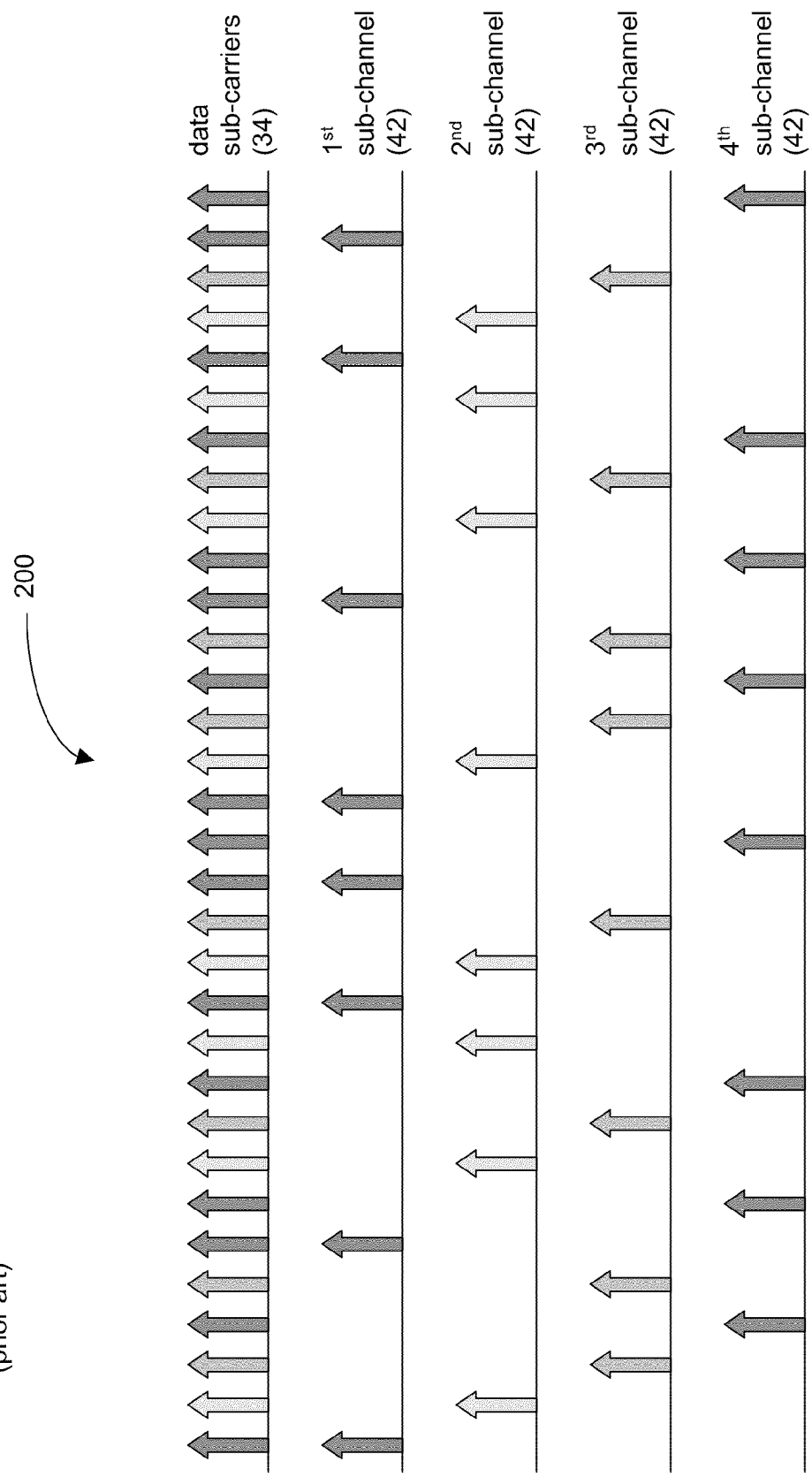
FIG. 4 is a block diagram of a simple subchannelization scheme, according to the prior art.

Before further describing the downlink subchannelization method 100, the environment in which the method may be used is illustrated in FIGS. 2, 3, and 4. FIG. 2 is a block diagram of a cellular neighborhood 50, including base stations 30 each supporting three surrounding sectors or cells 80. The sectors 80 are roughly hexagonal in shape, but may be differently shaped, depending on the environment supported by the base station 30, including the terrain, presence of buildings, water, and so on. Subscriber stations 40 occupy the sectors 80 and each subscriber station communicates with its serving base station 30. Communication from a subscriber station 40 to its serving base station 30 is an uplink transmission; communication from a serving base station 30 to the one or more subscriber stations 40 supported by the base station is a downlink transmission.

FIG. 3 is a schematic block diagram of an OFDMA sub-carrier structure 150, according to some embodiments. The sub-carrier structure 150 includes sub-carriers 58, including pilot sub-carriers 32, used for estimation and synchronization, data sub-carriers 34, used for data transmission, and null sub-carriers, including a DC sub-carrier 36 and guard band sub-carriers 38, which are not used for transmissions. The data sub-carriers 36 may be divided into groups known herein as sub-channels 90. Ellipses indicate that the OFDMA symbol may have many more sub-carriers 58 than are indicated in FIG. 3.

FIG. 4 depicts a simple subchannelization scheme 200, according to the prior art. At the top of the scheme 200 are thirty-two data sub-carriers 34, color-coded in four colors: red, yellow, green, and blue. The data sub-carriers 34 are divided into four groups of sub-channels 42, with each subchannel having eight data sub-carriers 34 of the same color. Subscriber stations 40 are allocated sub-channels 42 by their serving base station 30 according to many different schemes, such as fractional frequency reuse. In the prior art scheme of FIG. 4, the sub-channels 42 include only data sub-carriers 34, but do not include pilot sub-carriers 32.

In contrast to some prior art subchannelization methods, the sub-channels 90 (FIG. 1) of the subchannelization method 100 include pilot sub-carriers 32 as well as data sub-carriers 34. As used herein, a cluster 44 is defined as a minimal unit of sub-carriers 58, including at least one dedicated pilot sub-carrier 32 and one or more data sub-carriers 34. For example, a cluster 44 is depicted in FIG. 3, and has one pilot sub-carrier 32 and eleven data sub-carriers 34. In some embodiments, the cluster 44 has dimensions of 18×6, eighteen sub-carriers by six symbols, with 48 clusters occupying a 1024-sized fast Fourier transform (FFT).

Downlink Subchannelization

The subchannelization method 100 for downlink transmissions is described in detail, below, in view of the features defined in FIGS. 2, 3, and 4 and the above definitions. In addition to the illustrations, the process of downlink subchannelization method 100 includes three steps, indicated at the bottom of FIG. 1:

distribute miniBands to FFR groups
distribute clusters to localized groups and distributed groups
distribute sub-carriers 58 to sub-channels 90

These three steps are described in more detail, below.

Where the same sub-carriers are in the same time slots within nearby cells 80, collisions (interference) may occur.

Under WiMAX, the same frequency band may be used in other, usually non-adjacent cells 80. This principle is known as fractional frequency reuse (FFR). Under FFR, subscriber stations 40 located at the edge of the cell 80 are distinguished from subscriber stations located at the cell center. As one example, cell edge subscriber stations may operate with a fraction of the available sub-channels (known as frequency reuse 3) while the cell center subscribers operate with all available sub-channels (known as frequency reuse 1). FFR groups 1, 2, and 3 in FIG. 1 represent these user allocations. The subchannelization method 100 is designed with these FFR principles in mind.

As depicted in FIG. 1, the downlink subchannelization method 100 first partitions the bandwidth (physical frequency 60) into FFR groups 66, in the following steps. First, the physical frequency allotment 60 is divided into miniBands 62. An m-cluster miniBand is defined as a minimal portion of continuous frequency that will be allocated to a single FFR group. If, for example, m is two, then each miniBand includes two clusters 44. Next, the physical miniBands 62 are divided into logical miniBands 64, which are then distributed to the FFR groups 66. The logical miniBands 64 may be arranged in a different order than the physical miniBands 62, before being allocated to the FFR groups 66.

In some embodiments, the size of m may vary, both between FFR groups 66 and within an FFR group. This may be done in order to maximize diversity for distributed sub-channels 90 while maintaining large continuous miniBands for localized sub-channels. A possible way to vary m is to first permute units of $m_1$ (e.g. $m_1=4$) clusters 44. Then, some of the units are allocated as miniBands, and some of them are further permuted in units of $m_2$ clusters, where $m_2$ is less than $m_1$ (e.g. $m_2=1$), and then allocated as miniBands. The result of this process is that some miniBands are of size $m_1$ and some are of size $m_2$.

In some embodiments, the base station 30 defines the number and size (in miniBands 64) of each FFR group 66, known herein as the FFR group list 90. A semi-static process, the base station 30 may broadcast the FFR group list 90 to the subscriber station(s) 40 using the broadcast control channel (BCCH), as one example. In FIG. 1, there are three FFR groups 66, FFR group 1, FFR group 2, and FFR group 3. Table 1 is a sample FFR group list 90 for the FFR groups 66 of FIG. 1.

TABLE 1

| FFR group list 90 | | |
|---|---|---|
| | m | group |
| FFR group 1: | | |
| 4-cluster miniBand | 4 | localized group |
| 1-cluster miniBand | 1 | distributed group |
| FFR group 2: | | |
| 8-cluster miniBand | 8 | localized group |
| 1-cluster miniBand | 1 | distributed group 1 |
| 1-cluster miniBand | 1 | distributed group 2 |
| FFR group 3: | | |
| 4-cluster miniBand | 4 | localized group |
| 1-cluster miniBand | 1 | distributed group |

The FFR groups 1 and 3 each have two groups, a localized group 68 and a distributed group 70, with the localized group getting the larger miniBand. The FFR group 2 66 has three groups, two distributed groups 70 and one localized group, with the localized group getting the largest miniBand.

In some embodiments, the FFR group list 90 is coordinated between cells 80 of the cellular network 50, although the list is not necessarily identical to each cell. According to the FFR group list 90, miniBands are mapped to FFR groups 66 in a static way (renumbered and then mapped). In some embodiments, the renumbering (permutation) sequence is the same in all cells 80, with the goal to achieve maximum spreading. In some embodiments, the FFR groups 66 are orthogonal.

Once the logical miniBands 64 have been assigned to an FFR group 66, the FFR groups 66 are further sub-divided according to whether the clusters 44 are used for contiguous or distributed sub-channels 90. Recall that, under subchannelization, the sub-channels 42 may include contiguous sub-carriers (localized) or randomly distributed sub-carriers (distributed). When contiguous, the sub-channels 90 are known as localized sub-channels 68. When (pseudo-randomly) distributed, the sub-channels 90 are known as distributed sub-channels, and are grouped in distributed groups 70. As shown in FIG. 1, each FFR group 66 has both a localized group 68 and at least one distributed group 70. The FFR group 2 has two distributed groups, distributed group 1 and distributed group 2. In some embodiments, different distributed groups may be used to transmit with different pre-coding or beam-forming patterns, or with a different number of MIMO streams.

In some embodiments, each localized group 68 includes one or more dedicated, pre-coded pilot sub-carriers 32. For localized groups 68, there are one or more pilot sub-carriers sets 32 with potentially different overhead to support different MIMO ranks and to support single-user/multiple-user (SU/MU) MIMO (in the case of MU MIMO with a single stream per user, each user uses one data stream and one pilot stream. A pilot stream is a set of pilots intended for channel estimation from a single transmit antenna. In some embodiments, the localized groups 68 support MU MIMO with the overhead of a single pilot stream by overlaying the pilot sub-carriers 32 (as in code division multiplexing), assuming there is low cross-talk. For example, when transmitting to two subscriber stations 40 by the base station 30 over a cluster 44, the data intended for each subscriber station i (where I= 1, 2, . . . ) is modulated by a different pre-coding matrix, $F_i$, that is, beamformed, over the transmit antennas of the base station. A single set of pilot sub-carriers 32 is used for the two or more transmissions, where the pilot values, $v_k$, (where k denotes the location of the pilot sub-carrier) are a sum of fixed sequences, $p_{i,k}$, each multiplied by the pre-coder matrix intended for one subscriber station, as follows:

$$v_k = \sum_{i=1}^{\#users} p_{i,k} \cdot F_i$$

Each of the subscriber stations 40 correlates the pilot sub-carriers 32 with the fixed sequence intended for it $(p_{i,k})$ and then estimates the effective channel (which is the physical propagation channel multiplied by the pre-coding matrix, $F_i$).

In some embodiments, each distributed group 70 is a subset of the remaining clusters 44 after removal of the localized groups 68. The diversity resources (bursts) are interleaved over the FFR group 66, where the clusters are spread by pseudo-random order over the clusters in frequency and time. For example, if there are five clusters 44 in the distributed group 70, then five distributed sub-channels 90 are scattered over the five clusters. For the distributed groups 70, the pilot sub-carriers 32 are dedicated to the FFR group 66 and shared between all subscriber stations 40, although there may be just a single subscriber station.

In some embodiments, the downlink subchannelization method 100 is based on a six-symbol sub-frame, which is widely accepted in the 802.16m standard. The downlink subchannelization method 100 supports different modes in the same sub-frame. Additionally, in some embodiments, the downlink subchannelization method 100 supports:

both localized and distributed sub-carriers different modulation modes (MIMO, fixed/adaptive beamforming, MU-MIMO)

different FFR groups (reuse factors, powers, etc.).

In WiMAX-I, each combination of MIMO order, beamforming and reuse factor, requires a different zone. In contrast, the downlink subchannelization method 100 unites the features to reduce fragmentation and includes a comprehensive solution to multiple modes. The subchannelization method 100 has an optimized design for FFR and pre-coded-MIMO (MU or SU). Some of these modes are new in 802.16m, and the downlink subchannelization method 100 is implemented with these special designs in mind. Further, the method 100 uses dedicated and pre-coded pilots for demodulation which is advantageous for FFR and precoding/beamforming, and non-pre-coded pilots (known as "sounding" or "midamble" pilots) are sent infrequently. In some embodiments, the non-pre-coded pilots are sent one to two times per frame for closed-loop MIMO feedback. The downlink subchannelization method 100 supports one, two, three, or four streams with one, two, or four pilot streams. Since in the proposed method 100, the pilot sub-carriers 32 are not shared between FFR groups 66, the pilots form an integral part of the group and are boosted together with the data sub-carriers 34 of the FFR group. Therefore, the interference level on the pilots 32 has an approximately fixed ratio with the interference level on the data sub-carriers 34, which guarantees sufficient channel estimation performance, in some embodiments.

The downlink subchannelization method 100 supports FFR groups 66 with localized and diversity allocations. The number and size of FFR groups 66 is configurable in the system (reported, for example, in the broadcast control channel, BCCH). Each FFR group 66 may have different power, and potentially, FFR groups may have other attributes to help interference mitigation. For example, the FFR groups 66 may be restricted to low modulation and space time block coding (STBC), the number of streams may be restricted to one or two, and the FFR groups may have attributes intended for scheduling (e.g., price). This information may be shared with subscriber stations (users) on a slow update basis. The FFR groups 66 are distributed in frequency and interleaved with one another, similar to PUSC major groups, in order to yield diversity gain (high mobility) and scheduling gain (low mobility).

In some embodiments, the downlink subchannelization method 100 is preferred over prior art subchannelization schemes because of its hierarchical order of allocation. As explained above, the subchannelization method 100 distributes resources (sub-channels 90) to groups that are synchronized between cells 80, such as the FFR groups 66. From this distribution, each group 66 is sub-divided in a cell-specific manner into distributed 70 and localized 68 groups.

Figure 5:
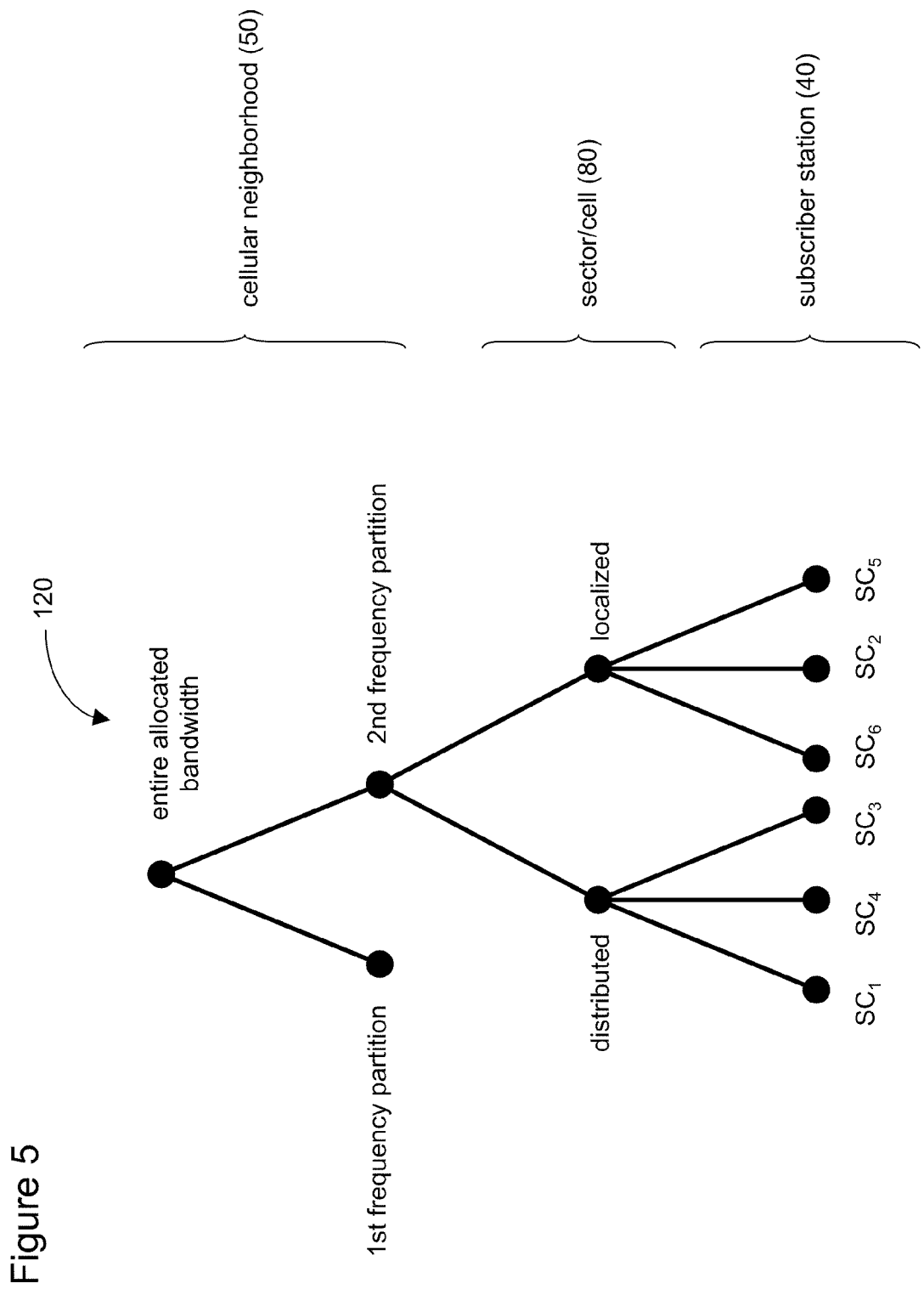
FIG. 5 is a diagram showing the hierarchical order of allocation performed by the subchannelization method of FIG. 1, according to some embodiments.

FIG. 5 illustrates this hierarchical model 120, according to some embodiments. The subchannelization method 100 takes the entire allocated bandwidth (physical frequency 60 in FIG. 1) and divides it up into multiple frequency partitions, such as the FFR groups 66 described above. The method 100 then divides each partition into both distributed and localized groups, from which sub-channels 90 are allocated. The allocated bandwidth and partitions are available to all in the cellular neighborhood 50 (or some portion thereof). The localized and distributed groups 68, 70 are designated only to the relevant cells 80, with other cells 80 seeing possibly different localized and distributed groups. Finally, the sub-channels 90 are designated to the users, the subscriber stations 40. For example, the sub-channels associated with the localized group denoted in FIG. 5 as $SC_6$, $SC_2$, and $SC_5$, may be assigned to a first set of subscriber stations while the sub-channels associated with the distributed group, denoted $SC_1$, $SC_4$, and $SC_3$, may be assigned to a second set of subscriber stations. The subscriber stations 40 will indicate a sub-channel preference to the base station 30, but the base station will ultimately make the selection. The subscriber stations 40 do not need to know the sub-channel allocations of other users. However, in some embodiments, the subscriber stations 40 are aware of the hierarchy 120, as the hierarchy enables each subscriber station to mimic its process, that is, breaking up the symbol into FFR groups, localized/distributed groups, sub-channels, and so on, so that the subscriber station may find its appropriate sub-channel.

Further, in contrast to prior art subchannelization schemes, the downlink subchannelization method 100 supports localized and distributed groups concurrently. Finally, the pilot sub-carriers 32, along with the data sub-carriers 34, are included in the localized and distributed groups generated by the subchannelization method 100. Advantageously, pilot sub-carriers 32 experience the same interference environment as the data sub-carriers 34 surrounding the pilots. Thus, it makes sense to group the pilot sub-carriers 32 with the data sub-carriers 34. In LTE (long-term evolution) systems, the pilot sub-carriers 32 are common to all groups. Thus, a pilot sub-carrier may have "reuse 1" while the data sub-carriers have "reuse 3". With this implementation, there is no direct relationship between the signal-to-interference-plus-noise ratios (SINR) on the data sub-carriers and the SINR on the pilot sub-carriers. Further, there may be a situation in which the subscriber station 40 performance is limited, not because of the SINR on the data sub-carriers, but because of bad SINR on the pilot sub-carriers 32.

While the application has been described with respect to a limited number of embodiments, those skilled in the art will appreciate numerous modifications and variations therefrom. It is intended that the appended claims cover all such modifications and variations as fall within the true spirit and scope of the invention.

I claim:

1. A subchannelization method comprising:

partitioning an allocated bandwidth, by a base station in a cellular neighborhood, into a plurality of orthogonal fractional frequency reuse groups, wherein each fractional frequency reuse group comprises data sub-carriers and pilot sub-carriers;

sub-dividing one of the plurality of orthogonal fractional frequency reuse groups into a first distributed group, the first distributed group comprising one or more clusters of pseudo-randomly distributed sub-carriers of the allocated bandwidth; and further sub-dividing the one of the plurality of orthogonal fractional frequency reuse groups into a localized group, the localized group comprising one or more clusters of contiguous sub-carriers of the allocated bandwidth, each cluster comprising at least one pilot sub-carrier modulated with pilot values and at least one data sub-carrier modulated with data, wherein the localized group comprises at least one pilot sub-carrier;

wherein the one or more contiguous sub-carriers are available to a subscriber station for communication in the cellular neighborhood.

2. The subchannelization method of claim 1, further comprising:
partitioning the allocated bandwidth into at least two orthogonal fractional frequency reuse groups of variable size;
sub-dividing one or more groups of sub-channels from one of the fractional frequency reuse groups; and
allocating a sub-channel from each group to the subscriber station for communication in the cellular neighborhood.

3. The subchannelization method of claim 1, further comprising:
dividing the allocated bandwidth into a plurality of miniBands, each miniBand comprising a minimal portion of continuous frequency to be allocated to the fractional frequency reuse group, wherein each miniBand comprises at least one cluster;
permuting the miniBands into logical miniBands; and
distributing the logical miniBands to the fractional frequency reuse group.

4. The subchannelization method of claim 3, further comprising:
broadcasting a fractional frequency reuse list to a cell in the cellular neighborhood, the cell comprising the subscriber station, the fractional frequency reuse list identifying the number and size, in miniBands, of the fractional frequency reuse group.

5. The subchannelization method of claim 1, further comprising:
allocating transmission for two or more subscriber stations over a cluster, wherein the data intended for each subscriber station is modulated by a different pre-coding matrix over transmit antennas; and
using a single set of pilot sub-carriers for the two or more transmissions, the pilot sub-carriers to be modulated by pilot values, wherein the pilot values comprise a sum of two or more fixed sequences each multiplied by the pre-coder matrix intended for one subscriber station.

6. The subchannelization method of claim 1, sub-dividing the fractional frequency reuse group into a first distributed group further comprising:
using fewer clusters to sub-divide the fractional frequency reuse group into the first distributed group than were used for the localized group.

7. The subchannelization method of claim 6, further comprising:
applying a first beamforming pattern to the first distributed group; and
applying a second beamforming pattern to the second distributed group; wherein the first beamforming pattern is different from the second beamforming pattern.

8. The subchannelization method of claim 1, further comprising:
sub-dividing the fractional frequency reuse group into a second distributed group, the second distributed group comprising one or more clusters of pseudo-randomly distributed sub-carriers of the allocated bandwidth, wherein the second distributed group is a subset of clusters remaining after the localized group and the first distributed group are generated.

9. The subchannelization method of claim 8, further comprising:
applying a first number of multiple-input-multiple-output streams to the first distributed group; and
applying a second number of multiple-input-multiple-output streams to the second distributed group;
wherein the first number is not equal to the second number.

10. The subchannelization method of claim 1, further comprising:
interleaving the sub-carriers in the first distributed group; and
allocating sub-carriers from the first distributed group to one or more distributed sub-channels;
wherein the number of clusters in the fractional frequency reuse group is equal to the number of localized sub-channels plus the number of distributed sub-channels.

11. A subchannelization method comprising:
partitioning an allocated bandwidth, by a base station in a cellular neighborhood, into a group of a plurality of groups, wherein the allocated bandwidth comprises data sub-carriers and pilot sub-carriers;
sub-dividing a localized group from the group, the localized group comprising one or more clusters of contiguous sub-carriers of the allocated bandwidth, each cluster comprising at least one pilot sub-carrier modulated with pilot values and at least one data sub-carrier modulated with data, wherein the localized group comprises at least one pilot sub-carrier, the localized group to be used by a first subscriber station;
sub-dividing the group into a distributed group, the distributed group comprising one or more clusters of pseudo-randomly distributed sub-carriers of the allocated bandwidth, wherein the distributed group comprises at least one second pilot sub-carrier, the distributed group to be used by a second subscriber station, the first and second subscriber stations being part of the cellular neighborhood; and
allocating sub-carriers from the localized group to one or more localized sub-channels, the one or more localized sub-channels being designated to the first subscriber station;
wherein the at least one pilot sub-carrier in the localized group and the at least one second pilot sub-carrier in the distributed group belong exclusively to the group.

12. The subchannelization method of claim 11, further comprising:
broadcasting a list to a cell in the cellular neighborhood, the cell comprising at least one subscriber station, the list identifying the number and size, in miniBands, of the group.

13. The subchannelization method of claim 11, further comprising:
sub-dividing the localized group from the group such that the localized group comprises a first set of pilot sub-carriers and a second set of pilot sub-carriers, wherein the first and second sets support both single-user and multiple-user multiple-input-multiple-output, including different multiple-input-multiple-output ranks.

14. The subchannelization method of claim 11, sub-dividing the group into a distributed group further comprising:
using fewer clusters to sub-divide the group into the distributed group than were used for the localized group.

15. The subchannelization method of claim 11, allocating sub-carriers from the localized group to one or more localized sub-channels further comprising:

allocating all sub-carriers in the one or more clusters of the localized group to the one or more localized sub-channels.

16. The subchannelization method of claim 11, further comprising:
   interleaving the sub-carriers in the distributed group; and
   allocating sub-carriers from the distributed group to one or more distributed sub-channels;
wherein the number of clusters in the group is equal to the number of localized sub-channels plus the number of distributed sub-channels.

17. A subchannelization method comprising:
   partitioning a physical frequency allocation into a first frequency partition and a second frequency partition by a base station in a cellular neighborhood, wherein the first frequency partition is designated for a first set of subscriber stations in the cellular neighborhood and the second frequency partition is designated for a second set of subscriber stations in the cellular neighborhood;
   sub-dividing the first frequency partition into a localized group and a distributed group, the localized and distributed groups each comprising at least one pilot sub-carrier modulated with pilot values and at least one data sub-carrier modulated with data;
   assigning the localized group to a first set of sub-channels, wherein the first set of sub-channels is designated to the first set of subscriber stations but not designated to the second set of subscriber stations in the cellular neighborhood;
   assigning the distributed group to a second set of sub-channels, wherein the second set of sub-channels is designated to the second set of subscriber stations but not designated to the first set of subscriber stations; and
   further sub-dividing the first frequency partition into a second distributed group, the second distributed group comprising at least one pilot sub-carrier and at least one data sub-carrier, the distributed group having a first beamforming pattern and the second distributed group having a second beamforming pattern;
wherein the first beamforming pattern is different from the second beamforming pattern.

* * * * *